United States Patent
Kushida

(10) Patent No.: US 8,440,757 B2
(45) Date of Patent: May 14, 2013

(54) RUBBER COMPOSITION FOR A TIRE TREAD AND PNEUMATIC TIRE USING THE SAME

(75) Inventor: Naoki Kushida, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 405 days.

(21) Appl. No.: 12/777,480

(22) Filed: May 11, 2010

(65) Prior Publication Data

US 2010/0294407 A1      Nov. 25, 2010

(30) Foreign Application Priority Data

May 20, 2009   (JP) ................................. 2009-122288

(51) Int. Cl.
    *C08K 3/34*      (2006.01)
(52) U.S. Cl.
    USPC ............ 524/492; 524/493; 524/495; 524/496
(58) Field of Classification Search .................. 524/492, 524/493, 495, 496
    See application file for complete search history.

(56) References Cited

U.S. PATENT DOCUMENTS

| | | | |
|---|---|---|---|
| 6,057,397 A * | 5/2000 | Takagishi et al. | 524/492 |
| 6,177,503 B1 | 1/2001 | Ariki et al. | |
| 6,518,350 B1 | 2/2003 | Kobayashi et al. | |
| 2005/0234182 A1 | 10/2005 | Kunisawa | |
| 2008/0223494 A1 | 9/2008 | Amino et al. | |

FOREIGN PATENT DOCUMENTS

| | | |
|---|---|---|
| JP | 11-181157 | 7/1999 |
| JP | 2000-273240 | 10/2000 |
| JP | 2001-106830 | 4/2001 |
| JP | 2004-175993 | 6/2004 |
| JP | 2005-248021 | 9/2005 |
| JP | 2006-143811 | 6/2006 |
| JP | 2008-056907 | 3/2008 |
| WO | WO/96/23027 | 8/1996 |

* cited by examiner

*Primary Examiner* — Edward Cain
(74) *Attorney, Agent, or Firm* — Thorpe North & Western LLP

(57) ABSTRACT

A rubber composition for a tire tread including a diene rubber component and silica and carbon black, and a pneumatic tire provided with a tread manufactured from this rubber composition, the diene rubber component including:

(A) from 30 to 80 mass % of a hydroxy group-containing aromatic vinyl-conjugated diene copolymer including from 20 to 30 mass % of aromatic vinyl units and from 0.1 to 10 mass % of isoprene units, and having an amount of vinyl bonds in a conjugated diene part from 40 to 60 mol %;

(B) from 10 to 50 mass % of a high-cis butadiene rubber having an amount of 90 mol % or more of cis-1,4 bonds; and (C) from 10 to 50 mass % of natural rubber;

wherein a total amount of the silica and the carbon black is from 90 to 150 parts by mass per 100 parts by mass of the diene rubber component.

19 Claims, No Drawings

RUBBER COMPOSITION FOR A TIRE TREAD AND PNEUMATIC TIRE USING THE SAME

PRIORITY CLAIM

This application is based upon and claims the benefit of priority from Japanese Patent Application No. 2009-122288, filed May 20, 2009, the entire contents of which is incorporated herein by reference.

DETAILED DESCRIPTION OF THE INVENTION

1. Technical Field

The present invention relates to a rubber composition for a tire tread and a pneumatic tire provided with a tread manufactured from this rubber composition. More specifically, the present invention relates to a silica-compounded diene rubber composition that displays highly balanced dry grip performance, wet grip performance, low rolling resistance, abrasion resistance, and performance on icy and snowy roads following vulcanization; and a pneumatic tire provided with a tread manufactured from this rubber composition.

2. Background of the Invention

In recent years, a great many performance attributes have come to be demanded of tires. Particularly, improvement in steering stability during high-speed traveling, improvement in braking ability and traveling stability on dry and wet road surfaces (dry grip performance and wet grip performance), and reduced rolling resistance to enable greater automobile fuel efficiency are strongly desired. Conventionally, compounding silica in a styrene-butadiene copolymer rubber (SBR) having a high glass transition temperature (Tg) as a rubber component is known as a method for improving wet grip performance and reducing rolling resistance. However, silica displays insufficient dispersion due to silica being highly agglutinative and having a low affinity for SBR. As a result, there exists the problem that, due to silica's low dispersion, silica-compounded rubbers display insufficient strength properties such as abrasion resistance and the like following vulcanization compared to carbon black-compounded rubbers. In Patent Documents 1 through 8 below, various techniques are proposed for the purpose of obtaining higher compounding and dispersion of silica in SBR including using a modified SBR, using a blend of SBR and another rubber component, and compounding a specific compatibility accelerator, a softener, or a silane coupling agent. However, for all-season tires and winter tires for use on icy and snowy road surfaces, performance on icy and snowy roads—specifically, superior braking ability and traveling stability on icy and snowy roads—is demanded in addition to dry grip performance, wet grip performance, abrasion resistance, and low rolling resistance (fuel economy).

SUMMARY OF THE INVENTION

Therefore, an object of the present invention is to provide a diene rubber composition that displays highly balanced dry grip performance, wet grip performance, abrasion resistance, low rolling resistance, and performance on icy and snowy roads following vulcanization; and a pneumatic tire having a tread manufactured from this rubber composition.

The present inventors, as a result of diligent research into a solution for the above problems, discovered that by using a hydroxy group-containing aromatic vinyl-conjugated diene copolymer having a specific amount of isoprene units, a high-cis butadiene rubber, and natural rubber in combination as a diene rubber component in a rubber composition for a tire tread including a diene rubber component and silica and carbon black as a reinforcing filler, and using such a rubber composition in a tire tread, superior performance on icy and snowy roads in addition to dry grip performance, wet grip performance, abrasion resistance, and low rolling resistance could be attained. Thus, the present invention was completed.

Specifically, the present invention provides a rubber composition for a tire tread including a diene rubber component and silica and carbon black, and a pneumatic tire provided with a tread manufactured from this rubber composition, the diene rubber component including:

(A) from 30 to 80 mass % of a hydroxy group-containing aromatic vinyl-conjugated diene copolymer including from 20 to 30 mass % of aromatic vinyl units and from 0.1 to 10 mass % of isoprene units, and having an amount of vinyl bonds in a conjugated diene part from 40 to 60 mol %;

(B) from 10 to 50 mass % of a high-cis butadiene rubber having an amount of 90 mol % or more of cis-1,4 bonds; and (C) from 10 to 50 mass % of natural rubber wherein a total amount of the silica and the carbon black is from 90 to 150 parts by mass per 100 parts by mass of the diene rubber component.

BEST MODE FOR CARRYING OUT THE INVENTION

A hydroxy group-containing aromatic vinyl-conjugated diene copolymer (rubber component (A)) for use in a diene rubber component of the rubber composition of the present invention has at least one hydroxy group in the molecule. The hydroxy group-containing aromatic vinyl-conjugated diene copolymer (A) can be obtained by, for example, copolymerizing a conjugated diene monomer unit and an aromatic vinyl monomer unit having an amount of aromatic vinyl units, isoprene units, and vinyl bonds as designated above, and having primary, secondary, or tertiary hydroxy groups. Alternatively, the hydroxy group-containing aromatic vinyl-conjugated diene copolymer (A) can be obtained by copolymerizing the aromatic vinyl monomer units and the conjugated diene monomer units to form a diene copolymer having an active metal bonded in the molecule; then reacting the diene copolymer with a modifier such as a ketone, an ester, an aldehyde, or an epoxy group in order to introduce the primary, secondary, or tertiary hydroxy group into the diene copolymer. The hydroxy group-containing aromatic vinyl-conjugated diene copolymer (A) can be formed according to a method described in Japanese Patent No. 3488926 (Patent Document 1). Additionally, a styrene-butadiene copolymer rubber that is terminally modified using a hydroxy group (hereinafter, "hydroxy group terminally modified SBR"), for example, that marketed as NS530 (manufactured by Zeon Corporation), can also be used as the hydroxy group-containing aromatic vinyl-conjugated diene copolymer (A). Examples of the aromatic vinyl monomer unit include styrene and substituted styrenes such as α-methylstyrene, 2-methylstyrene, 3-methylstyrene, 4-methylstyrene, and the like. Of these, styrene is preferable. Examples of the conjugated diene monomer unit include 1,3 butadiene and substituted butadienes such as 2-methyl-1,3-butadiene, 2,3-dimethyl-1,3-butadiene, and the like. Of these, 1,3-butadiene is preferable.

If the amount of aromatic vinyl units included in the hydroxy group-containing aromatic vinyl-conjugated diene copolymer (A) is less than 20 mass %, dry grip performance and wet grip performance will be negatively affected. If the amount of aromatic vinyl units included exceeds 30 mass %, low temperature performance will be negatively affected. If the amount of isoprene units included is less than 0.1 mass %, low heat build-up properties, wet grip properties, and abrasion resistance will be inferior. If the amount of isoprene units included exceeds 10 mass % wet grip properties and abrasion resistance will be inferior. Additionally, if the amount of vinyl bonds in the conjugated diene part is less than 40 mol %, dry grip performance and wet grip performance will be negatively affected. If the amount of vinyl bonds in the conjugated diene part exceeds 60 mol %, low temperature performance will be negatively affected. If the proportion of the hydroxy group-containing aromatic vinyl-conjugated diene copolymer in the diene rubber component is less than 30 mass %, dry grip performance and wet grip performance will be negatively affected. If the proportion of the hydroxy group-containing aromatic vinyl-conjugated diene copolymer in the diene rubber component exceeds 80 mass %, low temperature performance will be negatively affected.

The amount of cis-1,4 bonds included in a high-cis butadiene rubber (rubber component (B)) for use in the diene rubber component is 90 mol % or more, and preferably 95 mol % or more. The high-cis butadiene rubber (B) is obtained by blending a high molecular weight butadiene rubber having a weight-average molecular weight of from $5.0 \times 10^5$ to $1.0 \times 10^6$, and preferably from $5.5 \times 10^5$ to $9.0 \times 10^5$, and a low molecular weight butadiene rubber having a weight-average molecular weight of from $6.0 \times 10^3$ to $6.0 \times 10^4$, and preferably from $1.0 \times 10^4$ to $5.0 \times 10^4$ in advance in a solvent such as cyclohexane before compounding the rubber composition of the present invention. The amount of the low molecular weight butadiene rubber that forms the high-cis butadiene rubber (B) included is from 20 to 40 mass %, and preferably from 25 to 35 mass %. If the amount of cis-1,4 bonds included is less than 90 mol %, difficulty will be had in achieving sufficient low temperature performance following vulcanization. If the proportion of the high-cis butadiene rubber in the diene rubber component is less than 10 mass %, low temperature performance will be negatively affected. If the proportion of the high-cis butadiene rubber in the diene rubber component exceeds 50 mass %, dry grip performance and wet grip performance will be negatively affected. By including a specified proportion of the high-cis butadiene rubber including a high molecular weight component and a low molecular weight component having the above-specified weight-average molecular weights in the diene rubber component, a tire with balanced tire performance attributes according to the present invention can be achieved.

With the rubber composition of the present invention, any natural rubber that is conventionally used in the industry can be used as the natural rubber (rubber component (C)) for use in the diene rubber component. If a proportion of the natural rubber in the diene rubber component is less than 10 mass %, the strength of the rubber will decrease. If a proportion of the natural rubber in the diene rubber component exceeds 50 mass %, difficulty will be had in achieving the balance of tire performance attributes according to the present invention.

Examples of the silica that can be used in the present invention include any silica that is conventionally known for its use in rubber compositions such as dry silica, wet silica, colloidal silica, precipitated silica, and the like. A single silica can be used alone or a combination of two or more silicas can be used. Of these, a wet silica having hydrous silicic acid as a main component is preferably used. A specific surface area of the silica is not particularly limited, but a nitrogen specific surface area ($N_2SA$) calculated according to ASTMD3037 is preferably from 100 $m^2/g$ to 200 $m^2/g$, and more preferably from 110 $m^2/g$ to 180 $m^2/g$. It is preferable that the nitrogen specific surface area be within this range so that a rubber composition having excellent mechanical properties, abrasion resistance, low rolling resistance, and the like can be obtained.

Examples of the carbon black that can be used in the present invention include any carbon that is conventionally known for its use in rubber compositions such as furnace black, acetylene black, thermal black, channel black, graphite, and the like. A carbon black can be used alone or a combination of two or more carbon blacks can be used. Of these, in order to obtain higher reinforcement, furnace black is preferably used. Specific examples include grades such as SAF, ISAF, ISAF-HS, ISAF-LS, IISAF-HS, HAF, HAF-HS, HAF-LS, FEF, and the like. A specific surface area of the carbon black is not particularly limited, but a nitrogen specific surface area calculated according to ASTMD3037 is preferably from 70 $m^2/g$ to 150 $m^2/g$, and more preferably from 80 $m^2/g$ to 140 $m^2/g$. It is preferable that the nitrogen specific surface area be within this range so that excellent mechanical properties, abrasion resistance, low rolling resistance, and the like can be obtained. Additionally, while there is no particular limit on an amount of adsorbed dibutyl phthalate (DBP) in the carbon black, the amount is preferably from 70 $m^2/g$ to 150 $m^2/g$, and more preferably from 80 $m^2/g$ to 140 $m^2/g$. It is preferable that the adsorbed amount of DBP be within this range so that excellent mechanical properties, abrasion resistance, and the like can be obtained.

A total amount of silica and carbon black per 100 parts by mass of the diene rubber component is typically from 90 to 150 parts by mass, and preferably from 100 to 140 parts by mass. If the total amount of silica and carbon black falls outside this range, there is a concern that tire performance and processability will be negatively affected. An amount of compounded silica per 100 parts by mass of the diene rubber component is typically from 70 to 100 parts by mass, and preferably from 75 to 90 parts by mass. If the amount of compounded silica is too small, difficulty will be had in achieving a sufficient improvement in wet grip performance and rolling resistance. On the other hand, if the amount of compounded silica is too great, abrasion resistance and processability will be negatively affected. If the amount of compounded carbon black is too small, difficulty will be had in achieving a sufficient improvement in abrasion resistance. On the other hand, if the amount of compounded carbon black is too great, rolling resistance and processability will be negatively affected.

When including silica as a reinforcing filler in the rubber composition for a tire tread of the present invention, it is preferable to add a silane coupling agent so that a further improvement in rolling resistance and abrasion resistance can be achieved. Examples of silane coupling agents that can be used include publicly known agents such as alkoxysilanes like vinyltriethoxysilane, s-(3,4-epoxycyclohexyl), ethyltrimethoxysilane, N-(s-aminoethyl)-γ-aminopropyltrimethoxysilane, and the like; and sulfides such as bis(3-[triethoxysilyl]propyl) tetrasulfide, bis(3-[triethoxysilyl] propyl) disulfide, γ-trimethoxysilylpropyl dimethylthiocarbamyl tetrasulfide, γ-trimethoxysilylpropyl benzothiazyl tetrasulfide, and the like; and so forth. An amount of compounded silane coupling agent with respect to the silica is 15 mass % or less, and preferably from 5 to 10 mass %, based on a mass of the silica.

In addition to the reinforcing filler and the silane coupling agent, other compounding agents and additives known in the art such as vulcanization or cross-linking agents, vulcanization or cross-linking accelerators, zinc oxide, stearic acid, antiaging agents, processing aids, plasticizers, and the like can be added to the rubber composition of the present invention by commonly known compounding methods in commonly known usage amounts.

Following vulcanization, the rubber composition of the present invention preferably has a glass transition temperature in a range from −60° C. to −40° C. Balancing dry grip performance, wet grip performance, and performance on icy and snowy roads is possible when the glass transition temperature is within this range.

Additionally, following vulcanization, the rubber composition of the present invention preferably has a durometer hardness in a range from 55 to 68 at 20° C. Balancing dry grip performance, wet grip performance, and performance on icy and snowy roads is possible when the durometer hardness at 20° C. is within this range.

The rubber composition of the present invention can display highly balanced dry grip performance, wet grip performance, low rolling resistance, abrasion resistance, and performance on icy and snowy roads following vulcanization. Therefore, it is useful in the manufacturing of tread portions for all-season tires and winter-use tires.

The present invention is explained below in further detail, referring to the following examples and comparative examples. However, it goes without saying that the technical scope of the present invention is not limited by these examples.

EXAMPLES

Comparative Examples 1 to 6 and Examples 1 to 3

Preparation of Rubber Composition

According to the formulations shown in Table 1 below, the components other than sulfur and the vulcanization accelerator were mixed for 5 minutes using a 1.7 liter sealed Banbury mixer for 5 minutes, discharged from the mixer at 150° C., and then cooled to room temperature. After this, the sulfur and the vulcanization accelerator were mixed therein using an open roll to obtain the unvulcanized rubber compositions of Comparative Examples 1 to 6 and Examples 1 to 3. The unvulcanized rubber compositions of Comparative Examples 1 through 6 and Examples 1 through 3 were vulcanized for 30 minutes at 150° C. in a predetermined mold to obtain samples. The obtained samples were then evaluated according to the following test methods.

Test Methods for Evaluation of Physical Properties (1) Hardness (20° C.): Type-A durometer hardness at a temperature of 20° C. was measured according to Japanese Industry Standard (JIS) K6253.

(2) Low temperature performance: Type-A durometer hardness at a temperature of −20° C. was measured according to Japanese Industry Standard (JIS) K6253. Index values were recorded with Comparative Example 1 being 100. A smaller index value indicates lower hardness and superior low temperature performance when used in a tread portion of a tire.

(3) 300% modulus: A No. 3 dumbbell shaped test piece was made, and tensile stress at 300% elongation at room temperature (20° C.) was calculated according to Japanese Industry Standard (JIS) K6251. Index values were recorded with Comparative Example 1 being 100. A larger index value indicates higher hardness.

(4) tan δ (0° C.): According to Japanese Industrial Standard (JIS) K6301, a viscoelastic spectrometer (manufactured by Toyo Seiki Seisakusho, Co., Ltd.) was used to calculate a loss tangent (tan δ (0° C.)) under the following conditions at a temperature of 0° C.: initial distortion=10%; amplitude=±2%, frequency=20 Hz. Tan δ (0° C.) is commonly known as an indicator of wet grip performance. A larger index value indicates superior wet grip performance.

(5) tan δ (60° C.): According to Japanese Industrial Standard (JIS) K6301, a viscoelastic spectrometer (manufactured by Toyo Seiki Seisakusho, Co., Ltd.), was used to calculate a loss tangent (tan δ (60° C.)) under the following conditions at a temperature of 60° C.: initial distortion=10%; amplitude=±2%, frequency=20 Hz. Tan δ (60° C.) is commonly known as an indicator of rolling resistance. A smaller index value indicates less rolling resistance.

(6) Glass transition temperature (Tg): A temperature elevation speed of 20° C./min was calculated using a differential thermal analyzer according to the midpoint method.

Test Methods for Tire Performance Attributes (1) Dry grip performance: Tires manufactured using the rubber compositions of Examples 1 through 3 and Comparative Examples 1 through 6 in their respective tread portions and having a common size of 205/55R16 were mounted on a vehicle having an engine displacement of 2,000 cc and being equipped with ABS. The air pressure of both the front and the rear tires was set to 220 kPa. Braking distance was measured on a dry asphalt road surface at a speed of 100 km/hr. A braking distance index value of Comparative Example 1 was set as 100 and index values for Comparative Examples 2 through 6 and Examples 1 through 3 were recorded. A larger index value indicates shorter braking distance and superior dry grip performance.

(2) Wet grip performance: Tires manufactured using the rubber compositions of Examples 1 through 3 and Comparative Examples 1 through 6 in their respective tread portions and having a common size of 205/55R16 were mounted on a vehicle having an engine displacement of 2,000 cc and being equipped with ABS. The air pressure of both the front and the rear tires was set to 220 kPa. Braking distance was measured on a wet asphalt road surface having a water depth of from 2.0 to 3.0 mm at a speed of 100 km/hr. A braking distance index value of Comparative Example 1 was set as 100 and index values for Comparative Examples 2 through 6 and Examples 1 through 3 were recorded. A larger index value indicates shorter braking distance and superior wet grip performance.

(3) Performance on icy and snowy roads: Tires manufactured using the rubber compositions of Examples 1 through 3 and Comparative Examples 1 through 6 in their respective tread portions and having a common size of 205/55R16 were mounted on a vehicle having an engine displacement of 2,000 cc and being equipped with ABS. The air pressure of both the front and the rear tires was set to 220 kPa. Braking distance was measured on an icy and snowy road surface at a speed of 40 km/hr. A braking distance index value of Comparative Example 1 was set as 100 and index values for Comparative Examples 2 through 6 and Examples 1 through 3 were recorded. A larger index value indicates shorter braking distance and superior performance on ice and snow.

(4) Abrasion resistance: Tires manufactured using the rubber compositions of Examples 1 through 3 and Comparative Examples 1 through 6 in their respective tread portions and having a common size of 205/55R16 were mounted on a vehicle having an engine displacement of 2,000 cc and being equipped with ABS. The air pressure of both the front and the rear tires was set to 220 kPa and the vehicle was driven for 5,000 km. An abrasion resistance amount index value of Comparative Example 1 was set as 100 and index values for Comparative Examples 2 through 6 and Examples 1 through 3 were recorded. A larger index value indicates superior wear resistance.

TABLE 1

Composition of rubber composition (parts by weight) and test results

| | CE 1 | CE 2 | Ex 1 | Ex 2 | Ex 3 | CE 3 | CE 4 | CE 5 | CE 6 |
|---|---|---|---|---|---|---|---|---|---|
| Composition | | | | | | | | | |
| NR[1] | 20 | 20 | 20 | 20 | 20 | 20 | — | 20 | 20 |
| SBR 1[2] | 69 | 69 | — | — | — | 83 | — | — | — |
| SBR 2[3] | — | — | 63 | 63 | 75 | — | 110 | — | — |
| SBR 3[4] | — | — | — | — | — | — | — | 50 | 40 |
| BR[5] | 42 | 42 | 42 | 42 | 42 | 42 | 30 | 42 | 56 |
| Carbon black[6] | 25 | 25 | 25 | 25 | 25 | 25 | 25 | 25 | 25 |
| Silica[7] | 70 | 80 | 70 | 80 | 70 | 70 | 70 | 70 | 70 |
| Silane coupling agent[8] | 7 | 8 | 7 | 8 | 7 | 7 | 7 | 7 | 7 |
| Zinc oxide[9] | 2 | 2 | 2 | 2 | 2 | 2 | 2 | 2 | 2 |
| Stearic acid[10] | 2 | 2 | 2 | 2 | 2 | 2 | 2 | 2 | 2 |
| Antiaging agent[11] | 1 | 1 | 1 | 1 | 1 | 1 | 1 | 1 | 1 |
| Processing aid[12] | 2 | 2 | 2 | 2 | 2 | 2 | 2 | 2 | 2 |
| Aromatic oil[13] | 10 | 20 | 19 | 26 | 17 | 5 | 5 | 29 | 25 |
| Sulfur[14] | 2 | 2 | 2 | 2 | 2 | 2 | 2 | 2 | 2 |
| Vulcanization accelerator 1[15] | 2 | 2 | 2 | 2 | 2 | 2 | 2 | 2 | 2 |
| Vulcanization accelerator 2[16] | 1 | 1 | 1 | 1 | 1 | 1 | 1 | 1 | 1 |
| Physical Properties Test Results | | | | | | | | | |
| Hardness (20° C.) | 68 | 67 | 65 | 64 | 65 | 68 | 68 | 67 | 67 |
| Low temperature performance | 100 | 98 | 95 | 94 | 98 | 105 | 130 | 110 | 103 |
| 300% modulus | 100 | 102 | 103 | 104 | 104 | 101 | 108 | 10 | 97 |
| tan δ (0° C.) | 100 | 103 | 104 | 107 | 107 | 102 | 120 | 115 | 102 |
| tan δ (60° C.) | 100 | 97 | 95 | 92 | 98 | 103 | 110 | 102 | 99 |
| Tg | −60 | −60 | −57 | −57 | −55 | −56 | −38 | −50 | −55 |
| Tire Performance | | | | | | | | | |
| Dry grip performance | 100 | 95 | 103 | 102 | 105 | 102 | 110 | 103 | 97 |
| Wet grip performance | 100 | 105 | 107 | 110 | 112 | 103 | 113 | 103 | 98 |
| Performance on ice and snow | 100 | 100 | 105 | 106 | 103 | 96 | 80 | 90 | 100 |
| Wear resistance | 100 | 95 | 103 | 102 | 102 | 95 | 82 | 91 | 98 |

Notes for Table 1:
"CE" as used in Table 1 is an abbreviation for "Comparative Example".
"Ex" as used in Table 1 is an abbreviation for "Example".
[1]RSS #3
[2]Nipol NS460 (37.5 phr oil extension) (manufactured by Zeon Corporation)
[3]Nipol NS530 (hydroxy group terminally modified SBR; 20.2 phr oil extension; styrene content: 29 mass %; isoprene content: from 0.1 to 1.0 mass %; vinyl content in butadiene unit: 60 mol %) (manufactured by Zeon Corporation)
[4]Nipol NS616 (hydroxy group terminally modified SBR; non-oil extended; styrene content: 20 mass %; isoprene content: none; vinyl content in butadiene unit: 61 mol %) (manufactured by Zeon Corporation)
[5]BR X5000 (Rubber part: 71.5 mass %; cis-1,4 bond content: 96 mol %) (manufactured by Zeon Corporation)
[6]Carbon Black N234 (manufactured by Cabot Corporation)
[7]Zeosil 165GR (manufactured by Rhodia)
[8]Si69 (bis(3-[triethoxysilyl]propyl) tetrasulfide) (manufactured by Ebonic Degussa)
[9]Zinc Oxide #3 (manufactured by Seido Chemical Industry Co., Ltd.)
[10]Beads stearic acid (manufactured by NOF Corporation)
[11]6PPD (manufactured by Flexsys)
[12]Actiplast ST (manufactured by Rhein Chemie Rheinau GmbH)
[13]Extract No. 4S (manufactured by Showa Shell Sekiyu K.K.)
[14]"Golden Flower" Oil Treated Sulfur Powder (manufactured by Tsurumi Chemical)
[15]Noccelar CZ-G (manufactured by Ouchi Shinko Chemical Industrial Co., Ltd.)
[16]Soxinol DG (manufactured by Sumitomo Chemical Co., Ltd.)

Regarding the results of Table 1, a comparison, for example, of Comparative Examples 1 and 2 to Examples 1 and 2 shows that Examples 1 and 2 display superior dry grip performance, wet grip performance, abrasion resistance, low rolling resistance, and performance on icy and snowy roads over Comparative Examples 1 and 2. Moreover, even when the amount of compounded silica is increased, dry grip performance and abrasion resistance do not fall, and superior low rolling resistance and performance on icy and snowy roads are displayed. Furthermore, a comparison of Comparative Examples 1, 3, and 4 to Examples 1 and 3 shows that Examples 1 and 3 display a higher balanced dry grip performance, wet grip performance, abrasion resistance, low rolling resistance, and performance on icy and snowy roads over Comparative Examples 1, 3, and 4.

The invention claimed is:

1. A rubber composition for a tire tread comprising a diene rubber component and silica and carbon black, the diene rubber component comprising:
   (A) from 30 to 80 mass % of a hydroxy group-containing aromatic vinyl-conjugated diene copolymer comprising from 20 to 30 mass % of aromatic vinyl units and from 0.1 to 10 mass % of isoprene units, and having an amount of vinyl bonds in a conjugated diene part from 40 to 60 mol %;
   (B) from 10 to 50 mass % of a high-cis butadiene rubber having an amount of 90 mol % or more of cis-1,4 bonds; and
   (C) from 10 to 50 mass % of natural rubber;
   wherein a total amount of silica and carbon black is from 90 to 150 parts by mass per 100 parts by mass of the diene rubber component, and
   wherein the high-cis butadiene rubber (B) is obtained by blending a high molecular weight butadiene rubber having a weight-average molecular weight of from $5.0 \times 10^5$ to $1.0 \times 10^6$ and a low molecular weight butadiene rubber having a weight-average molecular weight of from $6.0 \times 10^3$ to $6.0 \times 10^4$ in a solvent; and an amount of the low molecular weight butadiene rubber included is from 20 to 40 mass %.

2. The rubber composition for a tire tread according to claim 1, wherein, following vulcanization, the rubber composition for a tire tread has a glass transition temperature in a range from −60° C. to −40° C.

3. The rubber composition for a tire tread according to claim 1, wherein following vulcanization, the rubber composition for a tire tread has a durometer hardness of from 55 to 68 at 20° C.

4. A pneumatic tire provided with a tread manufactured from the rubber composition for a tire tread according to claim 1.

5. The pneumatic tire according to claim 4, wherein the pneumatic tire is a winter use tire.

6. The rubber composition for a tire tread according to claim 1, wherein the carbon black has an ability to adsorb an amount of dibutyl phthalate from 70 m²/g to 150 m²/g.

7. The rubber composition for a tire tread according to claim 6, wherein the carbon black has an ability to adsorb an amount of dibutyl phthalate from 80 m²/g to 140 m²/g.

8. The rubber composition for a tire tread pneumatic tire according to claim 1, wherein the silica comprises 70 to 100 parts by mass per 100 parts by mass of the diene rubber component.

9. The rubber composition for a tire tread according to claim 1, wherein the high-cis butadiene rubber comprises an amount of 95 mol % or more of cis-1,4 bonds.

10. The rubber composition for a tire tread according to claim 1, wherein the high-cis butadiene rubber (B) is obtained by blending a high molecular weight butadiene rubber having a weight-average molecular weight of from $5.5 \times 10^5$ to $9.0 \times 10^5$ and a low molecular weight butadiene rubber having a weight-average molecular weight of from $6.0 \times 10^3$ to $6.0 \times 10^4$ in a solvent; and an amount of the low molecular weight butadiene rubber included is from 20 to 40 mass %.

11. The rubber composition for a tire tread according to claim 1, wherein the high-cis butadiene rubber (B) is obtained by blending a high molecular weight butadiene rubber having a weight-average molecular weight of from $5.0 \times 10^5$ to $1.0 \times 10^6$ and a low molecular weight butadiene rubber having a weight-average molecular weight of from $1.0 \times 10^4$ to $5.0 \times 10^4$ in a solvent; and an amount of the low molecular weight butadiene rubber included is from 20 to 40 mass %.

12. The rubber composition for a tire tread according to claim 1, wherein the high-cis butadiene rubber (B) is obtained by blending a high molecular weight butadiene rubber having a weight-average molecular weight of from $5.0 \times 10^5$ to $1.0 \times 10^6$ and a low molecular weight butadiene rubber having a weight-average molecular weight of from $6.0 \times 10^3$ to $6.0 \times 10^4$ in a solvent; and an amount of the low molecular weight butadiene rubber included is from 25 to 35 mass %.

13. The rubber composition for a tire tread according to claim 1, wherein the silica comprises a wet silica having hydrous silicic acid as a main component.

14. The rubber composition for a tire tread according to claim 1, wherein a nitrogen specific surface area of the silica comprises from 100 m²/g to 200 m²/g.

15. The rubber composition for a tire tread according to claim 14, wherein the nitrogen specific surface area of the silica comprises from 110 m²/g to 180 m²/g.

16. The rubber composition for a tire tread according to claim 1, wherein the carbon black comprises furnace black.

17. The rubber composition for a tire tread according to claim 1, wherein a nitrogen specific surface area of the carbon black comprises from 70 m²/g to 150 m²/g.

18. The rubber composition for a tire tread according to claim 17, wherein the nitrogen specific surface area of the carbon black comprises from 80 m²/g to 140 m²/g.

19. The rubber composition for a tire tread according to claim 1, wherein the total amount of silica and carbon black is from 100 to 140 parts by mass per 100 parts by mass of the diene rubber component.

* * * * *